United States Patent [19]
Wise et al.
[11] 3,826,988
[45] July 30, 1974

[54] PHASE DETECTOR

[75] Inventors: Robert G. Wise, Loveland; Harold Dean Wiebe, Sharonville, both of Ohio
[73] Assignee: Cincinnati Milacron Inc., Cincinnati, Ohio

[22] Filed: Sept. 13, 1973
[21] Appl. No.: 396,828

[52] U.S. Cl. .................... 328/133, 328/55, 328/151, 328/155
[51] Int. Cl. .................... H03b 3/04
[58] Field of Search ........... 328/133, 134, 140, 151, 328/155, 55

[56] References Cited
UNITED STATES PATENTS

| | | | |
|---|---|---|---|
| 3,521,084 | 7/1970 | Jones | 328/133 X |
| 3,601,708 | 8/1971 | Stempler | 328/155 |
| 3,688,211 | 8/1972 | Calaway | 328/133 X |
| 3,723,888 | 3/1973 | Ellis | 328/134 |

Primary Examiner—John S. Heyman

[57] ABSTRACT

An apparatus is disclosed for producing an output signal as a function of the phase difference between two input signals of the same frequency. A signal generator is responsive to one of the input signals to produce a ramp function signal having a zero magnitude located approximately in the center of said ramp function. A first sample circuit samples the ramp function in response to the first input signal to produce a control signal. A control circuit is responsive to the control signal and connected to the signal generator for synchronizing the zero magnitude of the ramp function with a predetermined point in each period of the first input signal. Consequently, there is a fixed relationship between the ramp function and the first input signal which is adaptively maintained by the control circuit. A second sample circuit samples the ramp function in response to the second input signal and produces an output signal representing the phase difference between the input signals.

13 Claims, 3 Drawing Figures

PHASE DETECTOR

BACKGROUND OF THE INVENTION

The invention relates generally to the area of phase detectors; and specifically, the invention provides a phase detector wherein the sampling reference signal is zero crossing locked to one of the input signals thereby eliminating any errors due to component drift or other circuit variables.

Various phase discriminators have been devised which employ a sample hold technique to compare the phases of two input pulses. The general sampling principle used by applicant has been used in the past. Typically, a ramp function is initiated in response to one input signal, and the level of the ramp is sampled by means of the second input signal. The magnitude of the ramp is stored in a hold capacitor through a sampling switch. The level stored in the hold capacitor is thus representative of the phase difference between the two input signals.

Previous sample hold circuits of the foregoing type have suffered from excessive drift due to temperature and supply voltage variations. In addition, a typical sampling circuit will use a trailing edge sample technique. With this process, any small variations in the sample pulse width will result in substantial inaccuracies in the sample level thereby causing errors in the output signal representing the phase difference. Further, with a single trailing edge sample, certain noise signals inherent in the hold circuit will produce a constant small fluctuation in the output signal. Finally, with a single sample, a relatively wide sample pulse is required to obtain a sufficiently large signal. This, of course, reduces the overall accuracy of the measuring process.

Applicant's invention solves the above problems. First, in applicant's circuit, the ramp function is maintained in synchronization with the first input signal. This eliminates any errors due to component drift, etc. Next, applicant's invention uses two sampling stages — a leading edge sample and a subsequent trailing edge sample. Therefore, the problems of a single sampling stage are eliminated.

SUMMARY OF THE INVENTION

According to one embodiment of applicant's invention an apparatus is provided for producing an output signal as a function of the phase difference between first and second input signals of the same frequency having positive going and negative going transitions. The apparatus includes means responsive to each occurrence of one of the transitions of the first input signal for generating a reference signal. The reference signal has a magnitude continuously changing in time from a positive value to a corresponding negative value. Means are further provided for sampling the reference signal in response to each occurrence of the other of the transitions of the first input signal to produce a control signal having a magnitude representing the magnitude of the reference signal at a time corresponding to the other of the transitions of said first input signal. The apparatus further includes means responsive to the control signal for adaptively controlling the reference signal so that it has a zero magnitude at a point in time corresponding to the other of the transitions of said first input signal. Finally, means are responsive to the second input signal and the reference signal for sampling the reference signal in response to the second input signal to produce the output signal which represents the phase difference between the input signals.

DESCRIPTION OF THE PREFERRED EMBODIMENT

Figure 1:
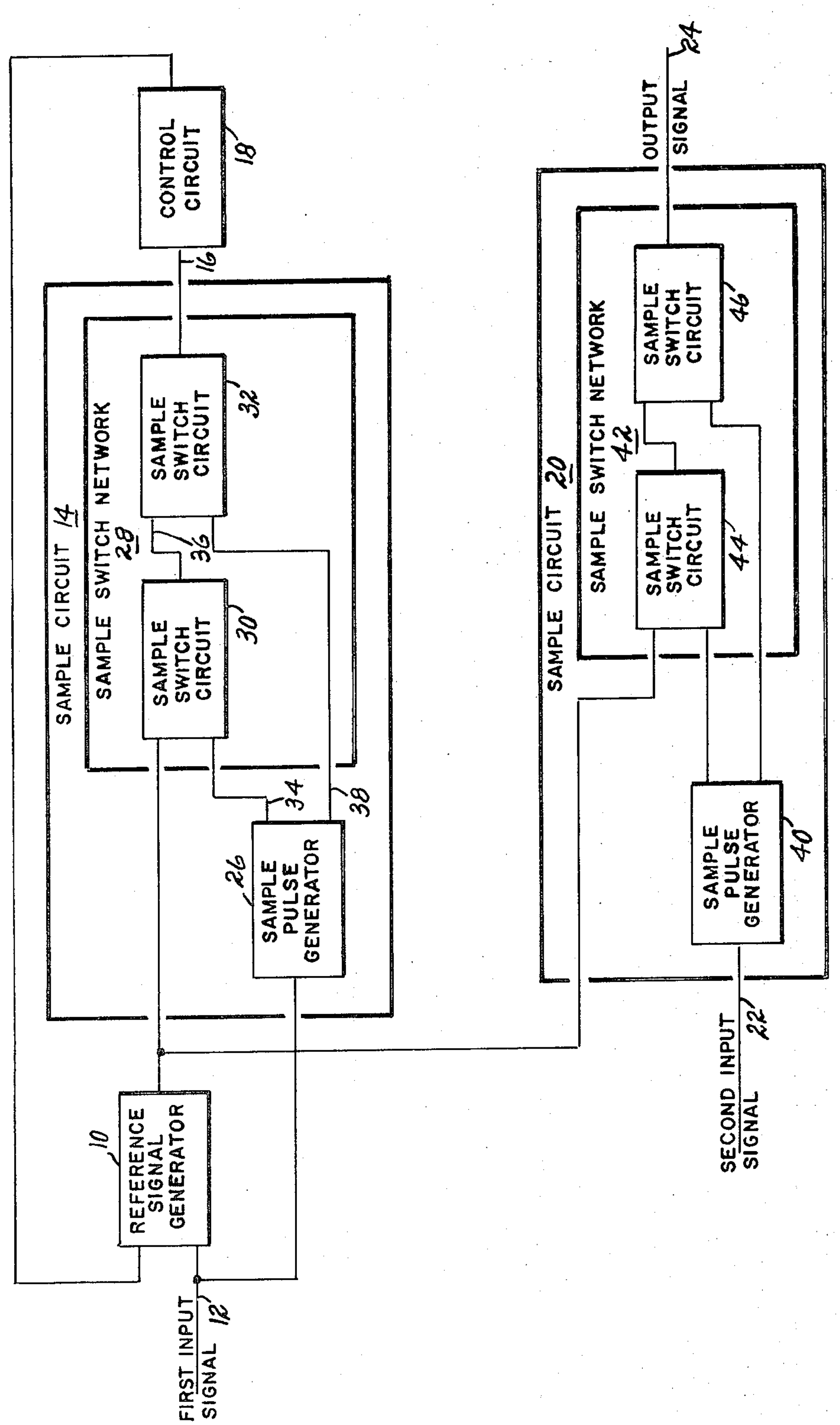
FIG. 1 is a general block diagram illustrating applicant's invention.

FIG. 1 is a general block diagram of applicant's invention. A reference signal generator 10 is responsive to a first square wave input signal on an input line 12 to produce a reference signal having a magnitude continuously changing in time from a positive value to a corresponding negative value. A sample circuit 14 is connected to the reference signal generator 10 and samples the reference signal as a function of the first input signal to produce a control signal on an output 16 thereof. A control circuit 18 is responsive to the control signal and connected to the reference signal generator 10 for maintaining a constant relationship between the reference signal and the first input signal. This circuit is operative to compensate for temperature variations, component drift, and other circuit variables which would cause the reference signal to shift in relation to the first input signal. Furher, a second sample circuit 20 is responsive to the reference signal and a second square wave input signal on an input line 22 for sampling the reference signal as a function of the second input signal to produce an output signal on the line 24. The output signal 24 represents the relationship between the reference signal and the second input signal, and consequently, represents the phase difference between the second input signal and the first input signal.

The sample circuit 14 contains a sample pulse generator 26 and a sample switch network 28. The sample pulse generator 26 is responsive to the first input signal for producing two sampling pulses. The sampling pulses occur simultaneously in time and are operative to initiate two independent sampling stages. The sample switch network 28 is comprised of a first sample switch circuit 30 and a second sample switch circuit 32. The first sample switch circuit 30 is responsive to the reference signal and the first sample pulse on line 34 for sampling the magnitude of the reference signal in response to the leading edge of the first sample pulse to produce a first sample level on line 36. The second sample switch circuit 32 is responsive to the first sample level and the second sample pulse on the line 38 for sampling the first sample level in response to the trailing edge of the second sample pulse to produce the control signal.

The second sample circuit 20 is identical to the first sample circuit 14 and contains a sample pulse generator 40 and sample switch network 42. The sample switch network 42 includes sample switch circuits 44 and 46. The sample circuit 20 provides a two-stage sample process which is functionally identical to the two-stage process in the first sample circuit 14.

Figure 2:
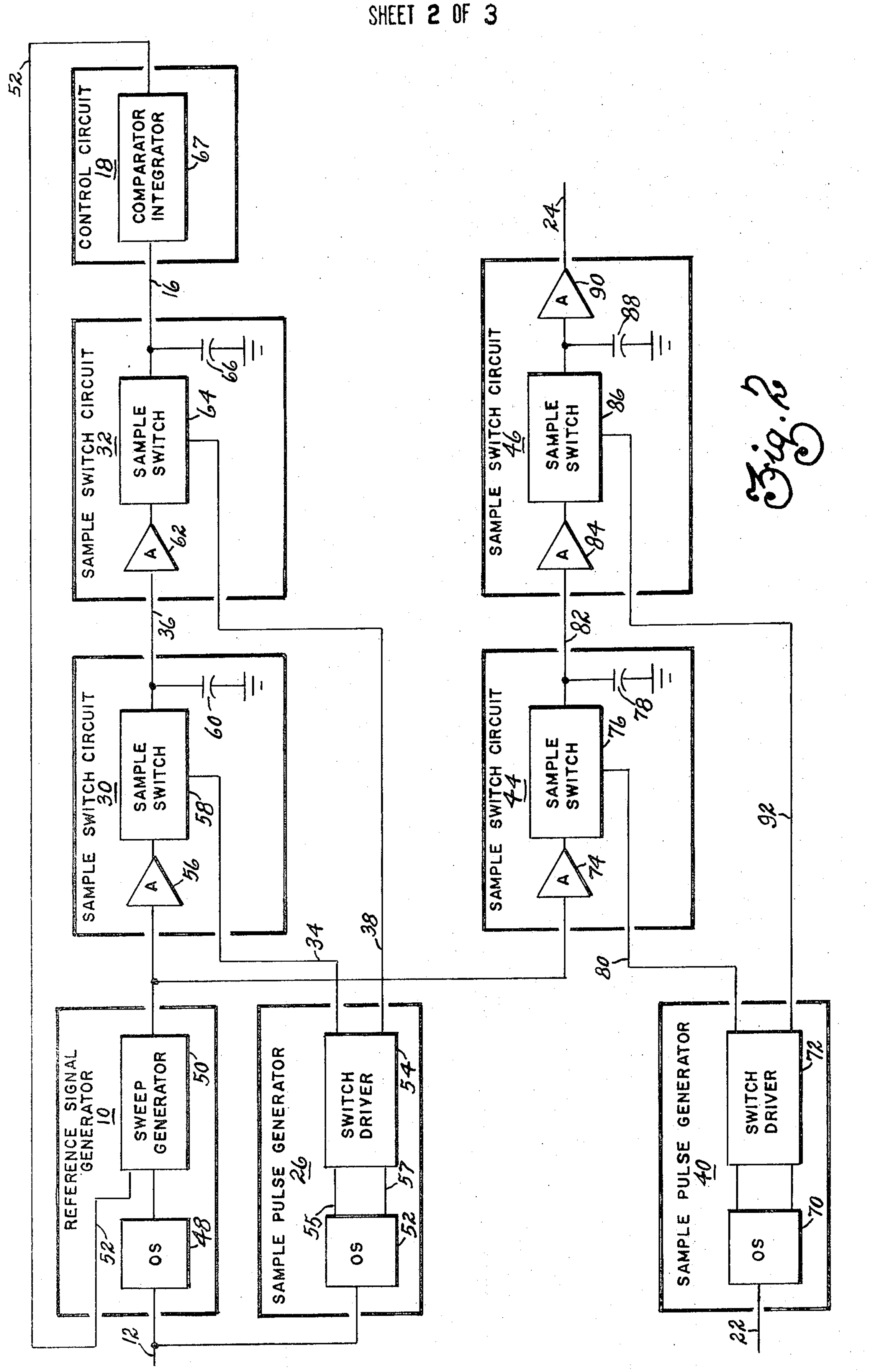
FIG. 2 is a detailed block diagram illustrating the component parts of applicant's invention.

FIG. 2 is a detailed block diagram illustrating lhe component parts of the circuit shown in FIG. 1. The reference signal generator 10 is responsive to a first input signal on line 12 having positive going and negative going transitions. A monostable or "one shot" multivibrator 48 is responsive to the positive going transitions of the first input signal for producing a trigger pulse therefrom. A sweep generator 50 is connected to the multivibrator 48 and has a second input 52. The generator 50 is operative in response to the trigger pulse to produce a reference signal having a magnitude continuously changing with time in an approximately linear manner from a positive value to a corresponding negative value. The reference signal is an input to the sample switch circuits 30 and 44. The sample pulse generator 26 and the sample switch circuits 30 and 32 comprise the first sample circuit 14 illustrated in FIG. 1. Similarly, the sample pulse generator 40 and sample switch circuits 44 and 46 comprise the second sample circuit 20 of FIG. 1. The sample pulse generator 26 is comprised of a monostable multivibrator 52 and switch driver 54. The multivibrator 52 is responsive to the negative going transitions of the first input signal for producing two trigger pulses on lines 55 and 56. The trigger pulses occur simultaneously in time but one is the inversion of the other; consequently, if the trigger pulse on line 55 has a positive going leading edge, the trigger pulse on line 56 will have a positive going trailing edge. These trigger pulses are inputs to a switch driver 54 which is operative to amplify the pulses without changing their relationship in time. The swith driver 54 produces a first sample pulse on line 34 and a second sample pulse on line 38.

The sample switch circuit 30 is comprised of a buffer amplifier 56, a sample switch 58, and a capacitor 60. The sample switch 58 operates in response to the first sample pulse to execute a leading edge sample of the reference signal produced by the sweep generator 50. The sample switch 58 produces a first sample level which is stored in the capacitor 60. The sample switch circuit 32 is comprised of the buffer amplifier 62, a sample switch 64, and a capacitor 66. The sample switch 64 operates in response to the second sample pulse on line 38 to execute a trailing edge sample of the first sample level as stored in the capacitor 60 thereby producing a control signal which is stored in the capacitor 66. The magnitude of the control signal on line 16 is an input to the control circuit 18 which is comprised of a comparator integrator 67. The control signal is compared to a predetermined reference level, and the difference is integrated to produce an error signal on line 52. The error signal is fed back to the sweep generator and is operative to change the slope of the reference signal in a manner causing the control signal on line 16 to go to zero.

The ultimate purpose of the circuit just described is to maintain synchronization between the negative going edge of the first input signal and a predetermined magnitude of the reference signal. The predetermined magnitude of the reference signal is arbitrarily chosen as zero. In the ideal situation, on the negative going transition of the first input signal the sample switch circuit will sample the reference signal which will be zero. However, if component drift, temperature variations, or other circuit variables cause the negative going transition of the first input signal to lose synchronization with the zero value of the reference signal, the sample switch circuits 30 and 32 will sense this non-synchronization and produces a control signal on the output line 16; and the control circuit 18 will generate an error signal change on the line 52. The sweep generator will respond to the change in the error signal to adjust the slope of the reference signal to bring the zero value thereof back in synchronization with the negative going transistion of the first input signal. The fixed relationship between the reference signal and the first input signal represents one of the unique aspects of applicant's invention.

Another unique aspect is the use of a two-stage sampling process. A leading edge sample is very difficult to use because the output from the sampling switch only exists for the duration of the sampling period. Consequently, any corrective action to be taken must occur within the duration of the sample pulse. This requires that the sampling pulse be of substantial width which reduces the accuracy of the sampling process. Further, even with the substantial sample pulse width, a circuit which adaptively reacts in such a short period of time is very complex and expensive. The other alternative is to use a single trailing edge sample switch. However, this particular circuit has the disadvantage in that the accuracy of the sampled output is a function of the accuracy of the sample pulse width. Very small deviation's in the sample pulse width will cause substantial variations in the output signal; therefore, applicant has chosen to use a two-stage sampling process. Applicant's first sampling stage is a leading edge sample. This permits a very fast and accurate sample of the desired value of the reference signal, and this signal is stored at a relatively low level. Next, the trailing edge sample samples a low but constant signal level to produce a sample signal which is accurate and of the necessary magnitude. Inasmuch as the input is constant, the small variations in the pulse width of the trailing edge sample are of no effect.

The sample pulse generator 40 is comprised of a monostable multivibrator 70 and switch driver 72 and is responsive to a second input signal on line 22 having positive going and negative going transitions and being of the same frequency as the first input signal. These elements are responsive to the negative going transitions of the second input signal to produce two sample pulses which occur simultaneously in time, but one pulse is the inversion of the other. The sample switch circuit 44 is comprised of a buffer amplifier 74, sample switch 76, and capacitor 78. The sample switch 76 is responsive to the reference signal and the third sample pulse on line 80 to execute a leading edge sample on the reference signal to produce a second sample level on the line 82. This second sample level is stored in the capacitor 78. The sample switch circuit 46 is comprised of a buffer amplifier 84, sample switch 86, capacitor 88, and buffer amplifier 90. The sample switch 86 executes a trailing edge sample on the reference signal in response to the fourth sample pulse on line 92, the result of which is stored in the capacitor 88. The buffer amplifier 90 is responsive to the capacitor 88 and produces the output signal on the line 24. The output signal is a very accurate representation of the phase difference between the first and second input signals.

Figure 3:
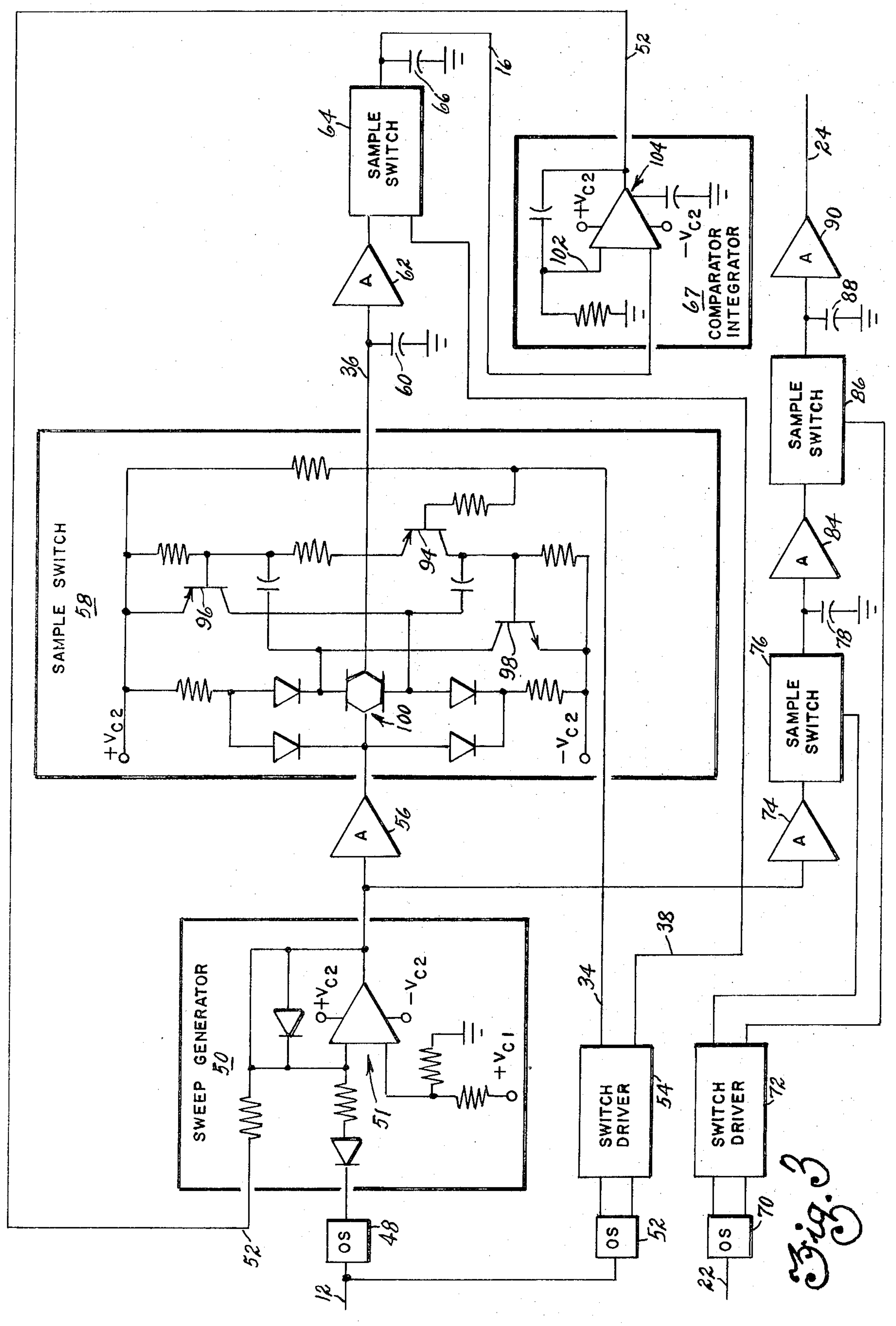
FIG. 3 is a detailed schematic diagram of several of the circuit components shown in FIG. 2.

FIG. 3 is a schematic diagram of the elements shown in FIG. 2. The multivibrator 48 is responsive to every positive going transition of the first input signal on line 12 to produce a trigger pulse having a negative going leading edge and positive going trailing edge. The sweep generator 50 is comprised of a sawtooth generator 51 which is reset on the leading edge of the trigger pulse and begins to produce a ramp function on the trailing edge of the trigger pulse. The ramp function begins at a positive level and decays through zero to a corresponding negative level. The ramp is then reset in response to a subsequent trigger pulse. The ramp function signal or reference signal passes through the buffer amplifier 56 and into the sample switch 58. At this point in time, the switch driver 54 is producing a positive level on the output line 34; consequently, the transistor 94 within the sample switch 58 is turned off. Likewise, the transistors 96 and 98 are turned off, and the sample switch 100 is conducting. The sample switch 100 is comprised of two FET's combined to form an ideal switch. On the negative going transition of the first input signal, the switch driver 54 produces a first sample pulse on the line 34 which is operative to turn on transistor 94. Conduction through transistor 94 is operative to switch transistors 96 and 98 into conduction; and consequently, conduction through the sample switch 100 is terminated. The value of the reference signal at the time the switch 100 is turned off is stored in the capacitor 60. The capacitor 60 is of a relative low value so that the affect of the voltage drop across the sample switch 100 is minimized.

The sample switch 64 is identical in construction to sample switch 58; however, its operation is the inversion of the operation of sample switch 58. Therefore, when the sample switch 58 is conducting the sample switch 64 is non-conducting. However, in response to a negative going transition of the first input signal, the switch driver 54 will produce a second sample signal which is operative to drive the sample switch 64 in conduction. Therefore, during the sampling period of the first and second sample pulses, the sample pulse 64 is conducting. At the end of the second sample pulse, the sample switch 64 will turn off and the capacitor 66 will store a value representing the signal flow through the sample switch at the time conduction is terminated. This value is a function of the first sample level which is stored in the capacitor 60 and represents a control signal which is an input 102 on line 16 to the comparator integrator 67. The comparator integrator contains a predetermined level on another input 102. The difference between the inputs to the comparator is integrated in the amplifier circuit 104, and an error signal is produced on the line 52. This error signal is fed back to the sweep generator 50 and is operative to change the magnitude of the positive and negative values of the ramp function. Consequently, the slope of the ramp function is changed, and the point at which it passes through a zero value is shifted in time. Therefore, the circuit is operative to adaptively synchronize the zero value of the reference signal with the negative going transition of the first input signal. In the sample switches 76 and 86, which are identical in construction and operation to the sample switches 58 and 64 respectively, the reference signal is sampled in response to negative going transitions of the second input signal on line 22. Consequently, the output signal on line 24 is a very accurate representation of the phase difference between the input signals. The construction amplifiers 56, 62, 74, 84 and 90 are substantially similar and well-known to those who are skilled in the art.

While the invention has been illustrated in some detail according to the preferred embodiment shown in the accompnaying drawing, and while the preferred illustrated embodiments have been described in some detail, there is no intention to thus limit the invention to such details. On the contrary, it is intended to cover all modifications, alterations and equivalents falling within the spirit and scope of the appended claims.

What is claimed is:

1. An apparatus for producing an output signal as a function of the phase difference between first and second input signals having positive going and negative going transitions, the apparatus comprising:

a. means responsive to one of the transitions of the first input signal for generating a reference signal, said reference signal having a magnitude continuously changing with time from a positive value to a corresponding negative value;

b. means responsive to the first input signal and the reference signal for sampling the reference signal in response to the other of the transitions of said first input signal to produce a control signal having a magnitude representing the magnitude of the reference signal at a time corresponding to the other of the transitions of said first input signal;

c. means responsive to the control signal and connected to the generating means for causing the reference signal to have a predetermined value at a point in time corresponding with the other of the transitions of said first signal; and d. means responsive to the second input signal and the reference signal for sampling the reference signal in response to one of the transitions of the second signal to produce the output signal representing the phase difference between the input signals.

2. An apparatus for producing an output signal as a function of the phase difference between first and second input signals of the same frequency having positive going and negative going transitions, the apparatus comprising:

a. means responsive to each occurrence of one of the transitions of the first input signal for generating a reference signal, said reference signal having a magnitude continuously changing with time in an approximately linear manner from a positive value to a corresponding negative value;

b. means responsive to the first input signal and the reference signal for sampling the reference signal and storing a first sample level representing the magnitude of the reference signal at a time corresponding to the other of the transitions of the first input signal;

c. means responsive to the first input signal and the first sample level for sampling the first sample level to produce a control signal representing the magnitude of the first sample level;

d. means responsive to the control signal and connected to the generating means for maintaining the other of the transitions of the first input signal coincident with a predetermined value of the reference signal; and e. means responsive to the second input signal and the reference signal for sampling the reference signal in response to one of the transitions of the second input signal to produce the output signal representing the phase difference between the input signals.

3. An apparatus for producing an output signal as a function of the phase difference between first and second input signals of the same frequency having positive going and negative going transitions, the apparatus comprising:

a. means responsive to each occurrence of one of the transitions of the first input signal for generating a reference signal, said reference signal having a magnitude continuously changing with time according to a predetermined function from a positive value to a corresponding negative value;
b. means responsive to the first input signal and the reference signal for sampling the reference in response to the other of the transitions of the first input signal and storing a first sample level representing the magnitude of the reference signal at a point in time corresponding to the other of the transistions of the first input signal;
c. means responsive to the first input signal and to the first sample level for sampling the first level to produce a control signal representing the magnitude of said first sample level;
d. means responsive to the control signal and connected to the generating means for maintaining a zero value of the reference signal in coincidence with the other of the transitions of the first input signal;
e. means responsive to the second input signal and the reference signal for sampling the reference signal in response to one of the transitions of the second input signal; and
f. means responsive to the second input signal and the second sample level for sampling the second sample level to produce the output signal representing the phase difference between the input signals.

4. The apparatus of claim 3, wherein the means for producing the reference signal comprises:

a. a monostable multivibrator responsive to the positive going transition of the first input signal for producing a trigger pulse; and
b. a sawtooth wave generator for producing a ramp function in response to the trigger pulse, said generator having an input operative to change the slope of said ramp function signal.

5. The apparatus of claim 4, wherein the means for producing first signal level comprises:

a. means responsive to each negative going transition of the first input signal for producing a first sample pulse; and
b. means responsive to the reference signal and the first sample pulse for sampling and storing the magnitude of the reference signal in response to the leading edge of the first sample pulse.

6. The apparatus of claim 5, wherein the means for producing the first signal level further comprises:

a. a monostable multivibrator responsive to the negative going transition of the first input signal for producing a first trigger pulse;
b. a driver amplifier responsive to the first trigger pulse for producing the first sample pulse;
c. a buffer amplifier responsive to the reference signal;
d. a sample switch connected to the buffer amplifier and responsive to the first sample pulse for sampling the reference signal in response to the leading edge of the first sample pulse to produce the first signal level; and
e. a capacitor connected between the sample switch and a predetermined reference level for storing the first sample level.

7. The apparatus of claim 6 wherein the means for producing the control signal comprises:

a. means responsive to the negative going transition of the first input signal for producing a second sample pulse, said second sample pulse occurring at the same time as and being an inversion of the first sample pulse; and
b. means responsive to the first signal level and the second sample pulse for sampling and storing the first signal level in response to the trailing edge of the second sample pulse to produce the control signal.

8. The appartus of claim 7, wherein the means for producing the control signal further comprises:

a. a one shot multivibrator responsive to each negative going transition of the first input signal for producing a second trigger pulse;
b. a driver amplifier responsive to the second trigger pulse for producing the second sample signal;
c. a buffer amplifier responsive to the first signal level;
d. a sample switch connected to the second buffer amplifier and responsive to the second sample pulse for sampling the first signal level in response to the trailing edge of said second sample pulse to produce the control signal; and
e. a capacitor connector between the predetermined reference level and the sample switch for storing the control signal.

9. The apparatus of claim 8, wherein the maintaining means comprises:

a. means having an output connected to the input of the sawtooth wave generator and an input responsive to the control signal for comparing the control signal to the predetermined reference level and integrating the difference therebetween to produce a signal for maintaining a zero value of the reference signal coincident with each of the negative going transitions of the first input signal.

10. The apparatus of claim 9, wherein the means for producing the second signal level comprises:

a. means responsive to each negative going transition of the second input signal for producing a third sample pulse; and
b. means responsive to the reference signal and the first sample pulse for sampling and storing the magnitude of the reference signal in response to the leading edge of the third sample pulse to produce the second signal level.

11. The apparatus of claim 10, wherein the means for producing the second signal level further comprises:

a. a monostable multivibrator responsive to each negative going transition of the second input signal for producing a third trigger pulse;
b. a driver amplifier responsive to the third trigger pulse for producing the third sample pulse;
c. a third buffer amplfier responsive to the reference signal;
d. a sample switch connected to the third buffer amplifier and responsive to the third sample pulse for sampling the reference signal in response to the leading edge of said third sample pulse to produce the second signal level; and e. a capacitor connected between a predetermined voltage source and the sample switch for storing the second sample level.

12. The apparatus of claim 11, wherein the means for producing the output signal comprises:

a. means responsive to each negative going transition of the second input signal for producing a fourth sample pulse, said fourth sample pulse occurring simultaneously in time with and being the inversion of said third sample pulse; and b. means responsive to the second sample level and the fourth sample pulse for sampling and storing the magnitude of the second sample level in response to the trailing edge of the fourth sample pulse.

13. The apparatus of claim 12, wherein the means for producing the output signal further comprises:

a. a monostable multivibrator responsive to each negative going transition of the second input signal for producing a fourth trigger pulse;

b. a driver amplifier responsive to the fourth trigger pulse for producing the fourth sample pulse;

c. a fourth buffer amplifier responsive to the second sample level;

d. a sample switch connected to the fourth buffer amplifier and responsive to the fourth sample pulse for sampling the magnitude of the second sample level in response to the trailing edge of the fourth sample pulse;

e. a capacitor connected between a predetermined voltage source and the sample switch for storing the sample magnitude of the second sample level; and f. a buffer amplifier connected to the capacitor for producing the output signal representing the phase difference between the input signals.

* * * * *